United States Patent

Cunningham et al.

[11] Patent Number: 4,686,439
[45] Date of Patent: Aug. 11, 1987

[54] MULTIPLE SPEED PUMP ELECTRONIC CONTROL SYSTEM

[75] Inventors: Robert L. Cunningham, Alamo; Charles R. Rhodes, Pleasant Hill; Carl Angotti, San Jose; Paul H. Warner, San Francisco, all of Calif.

[73] Assignee: A. T. Hunn Company, Oakland, Calif.

[21] Appl. No.: 774,512

[22] Filed: Sep. 10, 1985

[51] Int. Cl.⁴ ............................................. G05B 5/00
[52] U.S. Cl. .................................. 318/335; 318/306; 318/325; 318/481; 318/484
[58] Field of Search ............ 318/335, 333, 332, 305, 318/306, 308, 325, 387, 461, 452, 462, 481, 484, 644, 645, 310, 311, 326; 417/410, 12, 20, 43, 22, 31, 44; 210/416.2, 741

[56] References Cited

U.S. PATENT DOCUMENTS

| | | | |
|---|---|---|---|
| 3,223,911 | 12/1965 | Seiler | 318/325 |
| 3,363,161 | 1/1966 | Marlow | 318/481 |
| 3,473,549 | 10/1969 | Moyer | 318/484 X |
| 3,700,914 | 10/1972 | Granieri | 318/484 X |
| 3,855,515 | 12/1974 | Hutchins | 417/44 |
| 3,935,519 | 1/1976 | Pfarrer | 318/334 X |
| 3,985,467 | 10/1976 | Lefferson | 417/44 |
| 4,044,288 | 8/1977 | Godfrey | 318/484 X |
| 4,064,420 | 12/1977 | Yuda | 318/481 X |
| 4,097,791 | 6/1978 | Bivens | 318/484 |
| 4,108,574 | 8/1978 | Bartley | 417/22 |
| 4,207,031 | 6/1980 | Maskrey | 318/305 X |
| 4,227,128 | 10/1980 | Cockroft | 318/462 X |
| 4,256,998 | 3/1981 | Samuels | 318/481 X |
| 4,397,610 | 8/1983 | Krohn | 417/44 |
| 4,422,942 | 12/1983 | Allington | 210/741 |
| 4,545,906 | 10/1985 | Frederick | 210/416.2 |
| 4,574,226 | 3/1986 | Binder | 318/332 X |

Primary Examiner—William M. Shoop, Jr.
Assistant Examiner—Patrick C. Keane
Attorney, Agent, or Firm—Townsend and Townsend

[57] ABSTRACT

An electronic control system for a multiple speed fluid pump and motor. A parameter of the motor, the pump, or the fluid which is expelled from the pump is measured by a sensor. When a predetermined value of the parameter is reached, the sensor provides a trip signal to a timer circuit. The timer circuit provides a drive signal to a switch while the trip signal is present and for a specified period of time after the trip signal is removed. The switch, while it is receiving the drive signal, connects the motor driving the pump into a high speed configuration. After the specified period of time, the switch will cause the motor to change to low speed operation.

5 Claims, 3 Drawing Figures

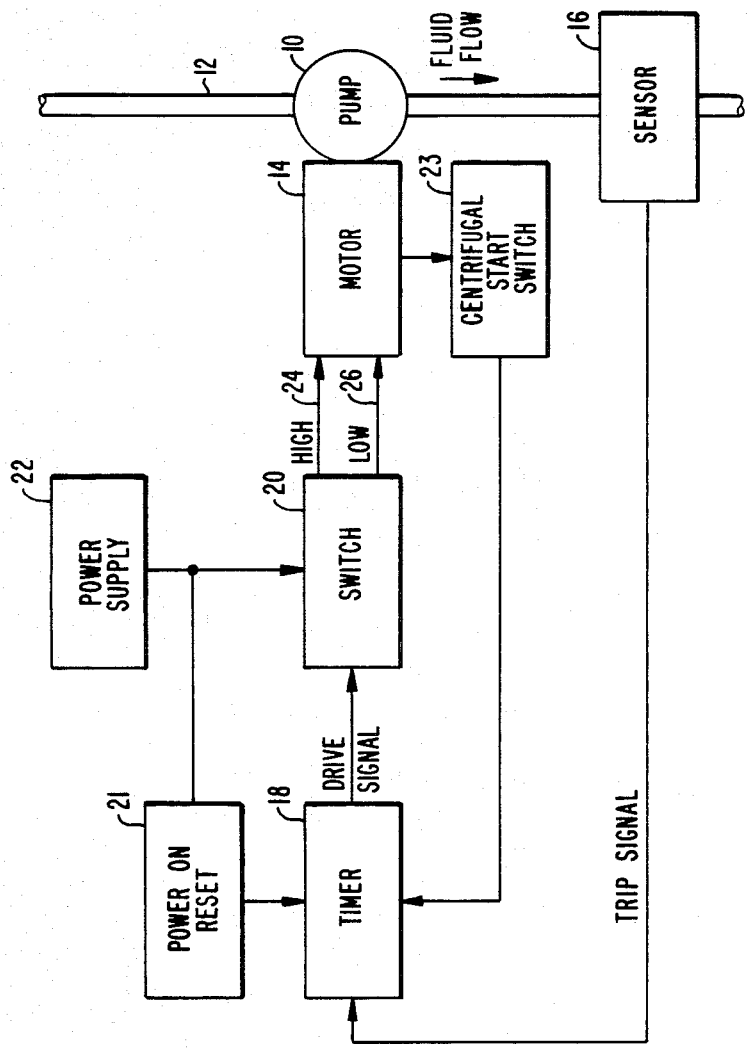
FIG._1.

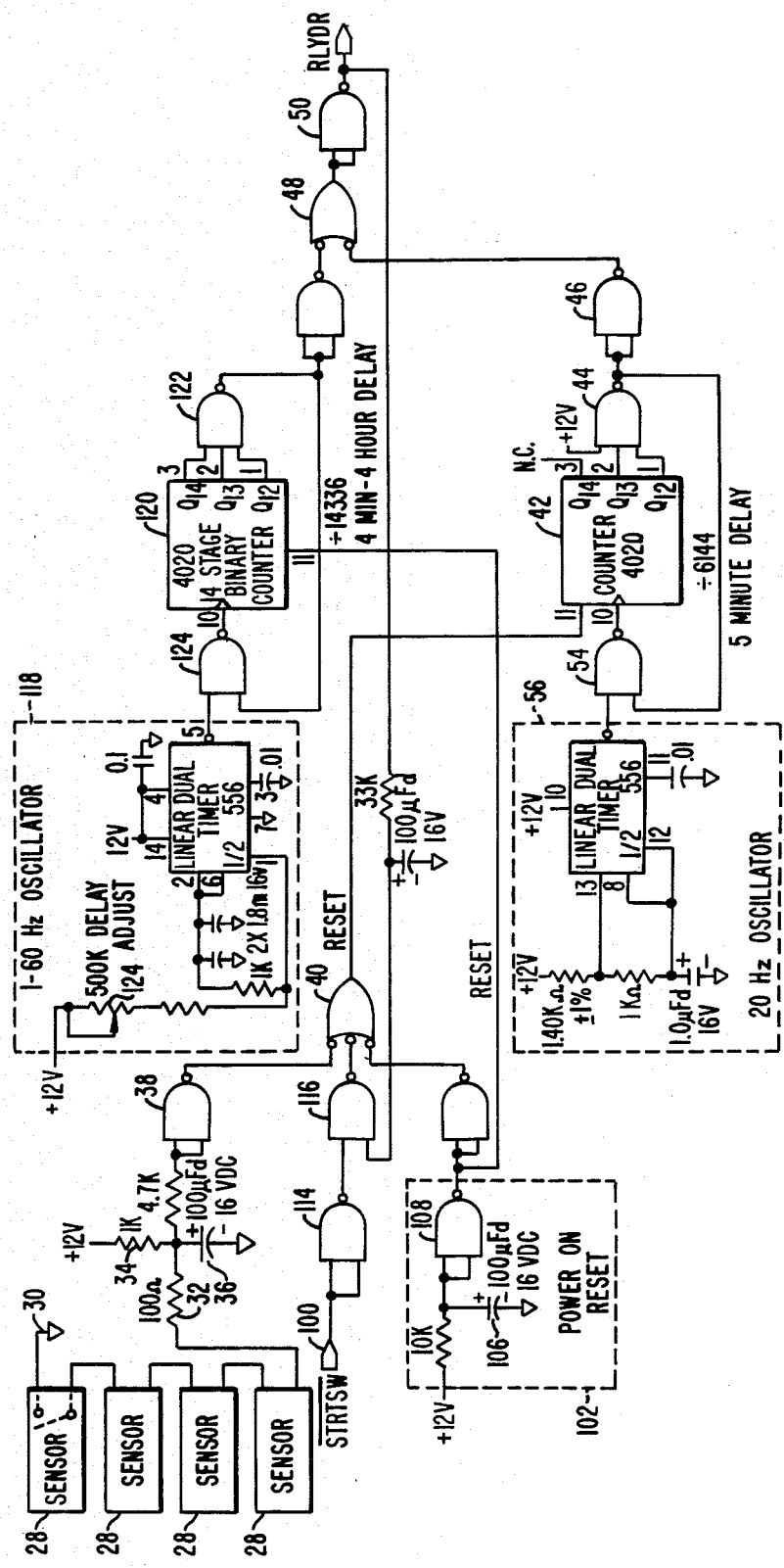
FIG._2A.

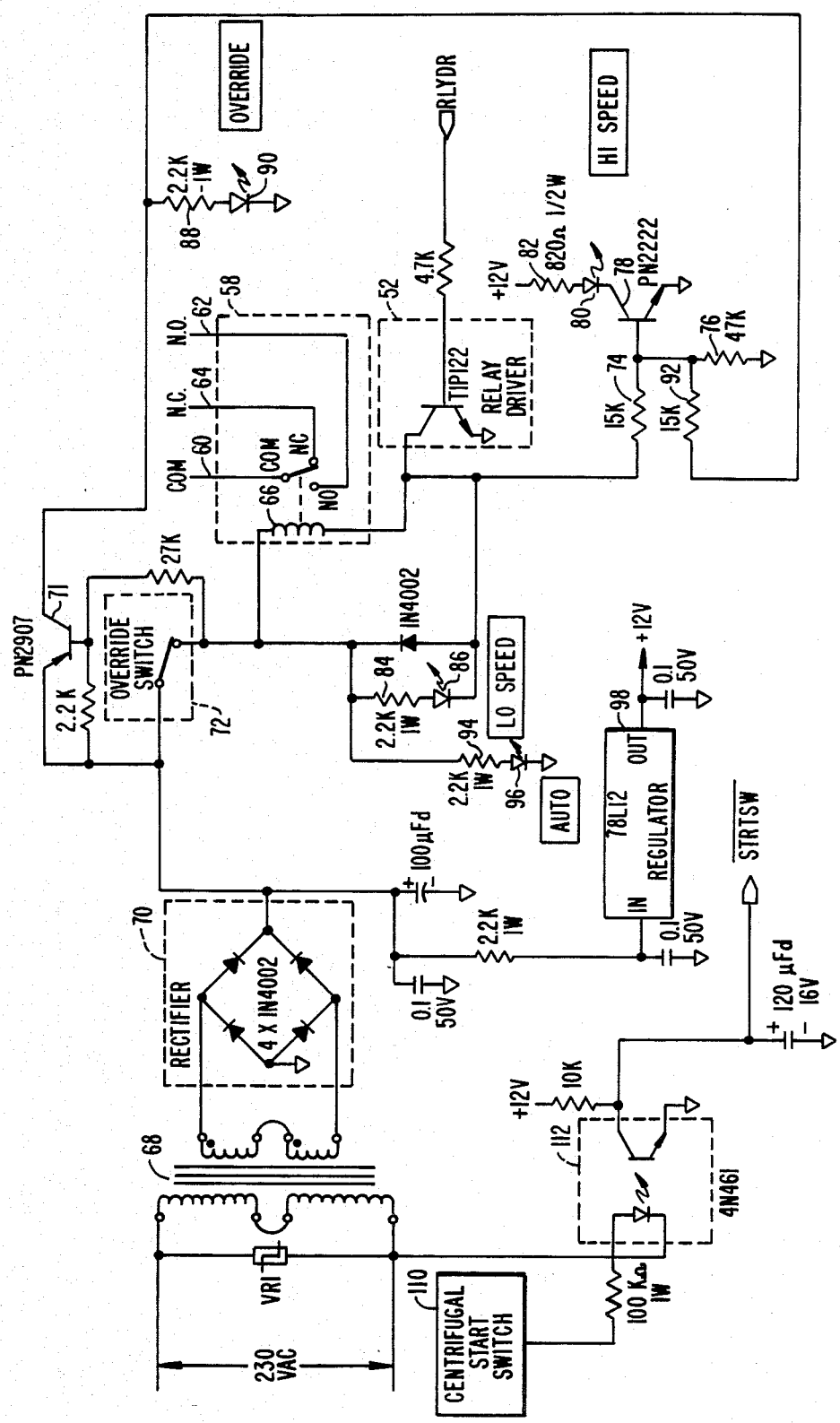
FIG._2B.

MULTIPLE SPEED PUMP ELECTRONIC CONTROL SYSTEM

BACKGROUND OF THE INVENTION

Pumps are used for many applications requiring the pumping of fluid and are often driven by an electric motor which operates at a single speed and has one coil or winding. Many motors have a second coil or winding which generates much higher power and is used as a starter winding to overcome the initial inertia of the pump and motor. Such a starter winding is usually activated for a period of less than a second after the motor is switched on before the main winding is engaged and the starter winding is disengaged.

Motors are typically designed to be able to deliver the maximum power needed for the particular application. Where motors are used for pumping fluids, this maximum power will be required to start the fluid flowing, which may take a few minutes, or when additional volume of fluid is suddenly required to be pumped, for instance. The design of motors to use enough power to handle the maximum load conditions results in an inherent energy inefficiency. This inefficiency results because more power is delivered to the motor than is needed at low load conditions, such as after a continuous flow has been established in a pumping system.

Some whirlpool spas utilize a two-speed motor which has, in addition to the starter winding, two additional windings enabling it to operate at a low speed and a high speed. The low speed is used for pumping water through a filtering system and the high speed is used for pumping water into the jets. A manual switch on the side of the motor enables it to be switched into the high speed mode for pumping through the jets when people desire to use the spa.

SUMMARY OF THE INVENTION

The present invention is an electronic control system for a multiple speed fluid pump and motor. A parameter of the fluid which is expelled from the pump (such as rate of flow) is measured by a sensor. When a predetermined value of the parameter is reached, the sensor provides a trip signal to a switch. The switch, while it is receiving the trip signal, connects the motor driving the pump into a high speed configuration.

Preferably, a timer circuit provides a drive signal to the switch for a specified period after the trip signal is removed. After the specified period of time has elapsed, the switch will cause the motor to change to low speed operation. This insures high speed operation for an additional period of time after the condition which caused high speed operation has vanished, thus giving a time cushion to insure that the condition is gone.

In the preferred embodiment, a relay switch is preferably used having a first end of its winding coupled to a power supply through a manual override switch and the other end of its winding coupled through a drive transistor to ground. The second end of the winding is also coupled through a resistance to ground. When the drive signal from the timer circuit is supplied to the base of the transistor, the transistor is turned on. The transistor causes a current to flow through the winding to ground, thereby activating the relay switch. When activated, the relay switch couples the low speed input of the motor to a power supply. When the timer drive signal is removed, the transistor is turned off and the second end of the winding is held at a high impedance level. No current will flow through the relay winding, thereby causing the relay switch to be deactivated. When deactivated, the relay switch couples the high speed input of the motor to the power supply.

The timer circuit is composed of an oscillator and a counter. The oscillator provides a signal to the clock input of the counter. A signal from the fluid flow sensor resets the counter, thereby removing the drive signal from the drive transistor. When the flow sensor signal is removed from the reset input, the counter will commence counting and the drive signal will remain removed while the counter is counting. The motor is connected in its high speed mode while the drive signal to the drive transistor is removed. The oscillator provides clocking signals which clock the counter until a count corresponding to the specified period of time has been reached. Logic circuits coupled to the counter outputs then activate the drive signal to return the motor to its low-speed mode and disable the oscillator from continuing to clock the counter. The next reset signal will again enable the clock input.

A variable timer is also provided by using a variable frequency oscillator controlled by a potentiometer. By varying the frequency of the clock input to the counter, the amount of time for the specified count to be reached will vary. The present invention can be used to control many different kinds of fluid flow systems, including a swimming pool filtering system as described in copending application Ser. No. 774,505, hereby incorporated by reference.

The centrifugal start switch of the motor provides a signal which is coupled to activate the high speed circuit. The centrifugal start switch is an RPM sensor which activates the start winding upon a loss of motor RPM's. The motor would then normally return to the speed mode in which it was operating before the RPM loss. The present invention operates to cause the motor to return to high speed operation after an RPM loss to insure the clearance of debris or whatever other problem caused the RPM loss.

The system is generally designed to return to high speed operation after any failure. The relay must be activated for low speed operation, thus ensuring high speed operation in the event of electronic failure.

The two speed pump electronic control system has several advantages. By using only a lower speed when that is sufficient, a tremendous savings in energy is attained. In addition, low speed operation typically means quieter operation of the pump and motor. Due to the extremely quiet operation of the motor, high speed and low speed indicator lights are provided to enable a user to determined whether the motor and pump are in fact operating.

The present invention can also be used with an electro-commutated motor which has a wide range of speeds. The particular speed of operation could be varied depending upon the application or the particular feedback used to change speed.

For a fuller understanding of the nature and advantages of the invention, reference should be made to the ensuing detailed description taken in conjunction with the accompanying drawings.

BRIEF DESCRIPTION OF THE DRAWINGS

FIG. 1 is block diagram of a preferred embodiment of a two speed pump control system according to the present invention; and FIGS. 2A and 2B are schematic diagrams of a preferred embodiment of a pump control system according to the present invention.

DETAILED DESCRIPTION OF THE PREFERRED EMBODIMENTS

FIG. 1 is a block diagram of a two speed pump control system according to the present invention. A pump 10 pumps a fluid through a pipe 12. Pump 10 is driven by a two speed motor 14. A sensor 16 measures the flow rate or pressure of the fluid output from the pump. When a designated flow rate or pressure is reached, sensor 16 provides a trip signal to a timer 18. Timer 18 then removes a drive signal from a switch 20. Timer 18 will cause the drive signal to remain removed for a predetermined amount of time after the trip signal is removed. Switch 20, while the drive signal is absent, supplies power from power supply 22 to a high speed input 24 of motor 14. After the predetermined period of time has elapsed, the drive signal will be applied by timer 18, causing switch 20 to supply power to low speed input 26 of motor 14. A power on reset circuit 21 activates timer 18 when power is initially turned on or after a loss of power. Centrifugal start switch 23 activates timer 18 upon a loss of RPM's by motor 14.

Thus, pump 10 will automatically respond to the fluid flow conditions and provide the amount of power necessary, thereby reducing energy losses. For example, upon initial start up of a system, the fluid will be at rest. Sensor 16 will detect this lack of flow, and cause pump 10 and motor 14 to operate at high speed. This high speed will continue for a predetermined period of time after flow is established and the signal from sensor 16 is removed. Once a continuous flow has been established, less energy is needed to keep the fluid flowing. Timer 18 is set for a period of time which is sufficient to ensure that a continuous flow of the fluid is firmly established. After this period of time elapses, the motor will be switched back to low speed operation.

If a need for high speed operation (i.e., lack of flow) should again occur, sensor 16 can again trip timer 18 and switch motor 14 to high speed. Such a condition may occur, for example, when additional fluid is diverted downstream of the pump, thus requiring more fluid to be pumped through. Another example would be in the situation where debris causes blockage in pipe 12, thereby slowing the rate of flow. This debris may be cleared by switching motor 14 to its high speed state, thereby forcing fluid under pressure through the debris blockage. In addition, a number of sensors 16 could be used at different points downstream of pump 12 or in different lines connected thereto.

FIGS. 2A and 2B show a schematic diagram of a preferred embodiment of a pump control system according to the present invention. FIG. 2A shows four sensors 28 coupled in series. An example of a system where four such sensors may be used is shown in copending application Ser. No. 774,505, which has been incorporated herein in full by reference. Alternately, one sensor could be used or any other number of sensors. Sensors 28 are coupled between ground 30 and a resistor 32. A trip signal is provided by any of the sensors causing a switch inside the sensor to open, thereby disconnecting the connection to ground and providing a trip signal through resistor 32. Resistor 32 is coupled between a second resistor 34 and a capacitor 36. Resistor 34 is coupled to a 12 volt power supply and capacitor 36 is coupled to ground. When a path through sensors 28 is uninterrupted, thereby connecting resistor 32 to ground, a low impedance path is provided to discharge capacitor 36, thereby applying a low signal to the input of NAND gate 38. When this path to ground is interrupted by a sensor opening its switch, the twelve volt supply will charge up capacitor 36, thereby providing a high level input to NAND gate 38. The output of NAND gate 38 is applied through a multiple input NOR gate 40 to a reset input of a counter 42.

Sensors 28 can serve many purposes. A low flow sensor could serve as a back up to start switch 110, described later, to insure that the pump motor operates at high speed when the system initially begins to pump fluid. The sensor will detect the lack of flow and trip. One of the sensors 28 could also detect a low flow condition due to fluid being diverted for another use, thus reducing the flow. The sensor would then cause the pump to switch into high speed operation in order to provide sufficient flow.

Counter 42 is connected to provide, after being reset, a signal through NAND gate 44, NAND gate 46, NOR gate 48, and NAND gate 50 to provide a low level signal to drive transistor 52 of FIG. 2B. Upon being reset, all the outputs of the counter are reset to zero and the output of NAND gate 44 is thus high since it has two low inputs and one input tied to a high voltage. This high level output of NAND gate 44 is fed back to an input of a NAND gate 54. This enables the output of NAND gate 54 to be controlled by an input from an oscillator 56. The output of NAND gate 54 thus clocks counter 42. Oscillator 56 is a 20 Hz oscillator and counter 42 is configured to trip NAND gate 44 when a count of 3,080 is reached. This provides an approximately five-minute delay. This 5-minute delay starts when the reset signal from the sensor is removed.

When the count of 3,080 is reached by counter 42, the output of NAND gate 44 will go to a low level, thereby disabling NAND gate 54 and preventing counter 42 from being further clocked by oscillator 56. Logic gates 44, 46, 48, and 50 then present a high level drive signal to transistor 52 of FIG. 2B.

Referring to FIG. 2B, transistor 52, when activated, will activate a relay 58 which will couple a common line 60 of the two speed motor to low speed winding input 62. When relay 58 is shut off upon transistor 52 being shut off, common line 60 is coupled to high speed input line 64 of the two speed motor. Power is supplied to a winding 66 of relay 58 from a 230 volt A/C 60 Hz supply through a transformer 68 and rectifying circuit 70. A 24 volt D/C voltage is provided by rectifying circuit 70 and is supplied through override switch 72 to winding 66.

When transistor 52 is activated, it couples one end of winding 66 to ground, thereby causing the current from the 2 volts applied to the winding to flow through the winding and activate the switch in relay 58. When transistor 52 is turned off at the end of the five-minute time period, winding 66 is isolated from ground by resistors 74 and 76. These resistors thus reduce the flow of current through winding 66 so that the relay 58 is not activated.

The circuit thus provides that high speed operation will result unless the relay is activated. The motor will thus assume its high speed mode in the event of electronic failure. The system is designed to cause high speed operation in the event of a failure of any kind.

A transistor 78, a light emitting diode (LED) 80, and a resistor 82 provide an indication of high speed operation. When relay driver transistor 52 is off, the voltage at the base of transistor 78 will be high, thereby turning it on and causing the current to flow through LED 80. This indicates high speed operation. When relay driver transistor 52 is on, resistor 74 is coupled to ground through transistor 52 and a low voltage is applied to the base of transistor 78, turning it off, and thereby removing current flow through LED 80, thus turning it off.

A low speed indicator light is provided by resistor 84 and LED 86. In the low speed mode, when relay driver transistor 52 is on, resistor 84 and LED 86 will have 24 volts applied across them and current will flow, thereby causing LED 86 to emit light. When relay driver 52 is turned off during a high speed mode, the high resistance combination of resistors 74 and 76 raise the voltage level at the anode of LED 86, thereby greatly reducing the voltage drop across resistor 84 and LED 86 so that there is insufficient current to cause light to emit from LED 86.

Override switch 72 enables the five minute timer to be overridden and the motor to be shifted to its high speed mode. Override switch 72 operates to remove the 24 volt D/C voltage from winding 66, thereby deactivating relay 58 by preventing current from flowing through winding 66. Common line 60 is then coupled to high speed input 64 to operate the motor at high speed. An override indicator is provided by resistor 88 and LED 90. High speed operation is indicated by providing the 24 volt D/C voltage through a transistor 71 and through a resistor 92 to the base of transistor 78.

An indication that the control system is operating in the automatic mode is provided by a resistor 94 and LED 96. When override switch 72 is activated, power is removed from resistor 94 and diode 96, thereby causing the automatic mode light to turn off.

A 12-volt voltage regulator 98 is coupled to the 24-four volt D/C voltage from rectifier 70 to produce a 12-volt supply for the control circuit.

Returning to FIG. 2A, the reset input of counter 42 can also be activated by a start switch signal 100 or a power on reset circuit 102. Power on reset circuit 102 provides a signal to an input of NOR gate 40 when power is initially supplied by an external switch. Before power is applied, or upon an interruption of power or a power outage, the twelve volts supplied to resistor 104 and capacitor 106 will be removed, thereby causing capacitor 106 to discharge and present a low level logic input to NAND gate 108. This low level input will produce a high level output of NAND gate 108 which is coupled as an input to NOR gate 40. When power is applied or restored, capacitor 106 will charge up and produce a high level input to NAND gate 108 and thus a low level input to NOR gate 40, thereby producin a reset signal to the reset input of counter 42. Power on reset circuit 102 thus shifts the motor into high speed operation when the motor is initially started.

Start switch signal 100 is provided from a centrifugal start switch 110 of FIG. 2B. The centrifugal start switch provides a signal when it detects a loss of motor RPM's and reactivates the starter winding. This signal is used to trigger high speed operation to insure clearance of whatever problem (debris in the motor, etc.) caused the loss of RPM's. Without the triggering of high speed operation by the present invention, the motor would restart in whatever speed it was operating when the RPM loss occurred. If this was low speed, another RPM loss may occur because low speed operation would not clear whatever caused the RPM loss. Thus, cycling between the start and low speed windings might occur. In addition, if the motor should try to restart at low speed, the back pressure of fluid on the pump might cause it to start in the reverse direction. This could cause the impeller to spin off the shaft. By automatically restarting at high speed, these problems are avoided.

Start switch 110 is coupled through an optically coupled isolator 112 to provide protection from high voltae transients and surge voltage. These transients and surge voltages may appear on the 230 Volt, 60 Hz A/C supply which is provided as an input to optically coupled isolator 112.

Start signal 100 is processed through NAND gates 114 and 116 to provide an input to NOR gate 40. As can be seen, if either one of the inputs to NOR gate 40 is activated, a reset signal will be applied to counter 42, thereby shifting the motor into high speed operation.

A variable delay is provided by a variable oscillator 118 and a counter 120. The operation of oscillator 118 and counter 120 is similar to that of oscillator 56 and counter 42, with NAND gates 122 and 124 performing similar functions to those of NAND gates 44 and 54. The frequency of the oscillator is controlled by a potentiometer 124 which can be set to provide a freuency ranging from 1 to 60 Hz. By connecting counter 120 to provide a count of 14,336, the time delay can be varied between approximately 4 minutes and 4 hours. A different period could be provided for with appropriate circuitry. The variable delay can be used to override the 5-minute delay when high speed operation of the pump is desired for a particular period of time. One such use is the operation of a swimming pool cleaner which requires a pump motor to be operating at high speed for more than five minutes.

As will be understood by those familiar with the art, the present invention can be embodied in other forms without departing from the spirit or essential characteristics thereof. For example, the number of sensors could be varied, or the timers could be constructed of different circuits. The logic and motor connections could be reversed, so that high speed operation occurs when the relay is activated. The invention could also be used for other fluid systems, such as air conditioners or refrigerators. Accordingly, the foregoing embodiments are intended to be illustrated of, but not limiting of, the scope of the invention which is set forth in the following claims.

What is claimed is:

1. A control system for two speed fluid pump having a first electrical power input for operation at a first low speed and a second electrical power input for operation at a second, high speed, comprising:
   means for automatically sensing one of a rate of flow and a pressure of a fluid expelled from said pump and providing a trip signal at a predetermined value of one of said rate of flow and pressure;
   an oscillator;
   a counter having a clock input coupled to said oscillator, a reset input coupled to said sensing means, and an output;
   a relay for selectively coupling said first and second electrical power inputs to a power supply, said relay having a winding coupled at a first end to a second power supply; and
   a drive transistor having a collector coupled to a second end of said winding, an emitter coupled to ground, and a base coupled to said output of said counter.

2. A control system for a multiple speed electric motor for a fluid pump having at least a first low speed and a second, high speed of operation, comprising:
   means for automatically sensing a parameter of one of said motor, said pump and a fluid expelled from said pump and providing a trip signal responsive to the value of said parameter;
   means for switching said motor to said first speed in response to a first value of said trip signal and for switching said motor to said second speed in response to a second value of said trip signal, and
   timer means for maintaining said motor at said second, high speed for a predetermined period of time after said trip signal changes from said second value to said first value, said timer means including an oscillator; and
      a counter having a clock input coupled to said oscillator, a reset input coupled to said sensing means, and an output coupled to said switch means.

3. The apparatus of claim 2 further comprising power on reset means for providing a reset signal to said reset input of said counter when power is supplied to said pump.

4. A control system for a multiple speed electric motor for a fluid pump having at least a first low speed and a second, high speed of operation, said motor having a first electrical power input for operation at said first speed and a second power input for operation at said second speed, comprising:
   means for automatically sensing a parameter of one of said motor, said pump and a fluid expelled from said pump and providing a trip signal responsive to the value of said parameter;
   means for switching said motor to said first speed in response to a first value of said trip signal and for switching said motor to said second speed in response to a second value of said trip signal, said means for switching including
      a relay for selectively coupling said first and second power inputs to a power supply, said relay having a winding coupled at a first end to a second power supply;
      a drive transistor having a collector coupled to a second end of said winding, an emitter coupled to ground, and a base coupled to said timer means; and
      an impedance coupling said second end of said relay winding to ground said impedance including a first and second resistance in series coupled at a junction and further including a second transistor having a base coupled to said junction, a collector, and an emitter coupled to ground, and a third resistance in series with a light-emitting diode coupled between said collector of said second transistor and a second power supply, said light-emitting diode indicating high power operation of said pump;
   whereby said relay is activated to couple said first power input to said power supply when said drive transistor is turned on by said first drive signal and said relay is deactivated to couple said second power input to said power supply when said drive transistor is turned off by said second drive signal.

5. The apparatus of claim 4 further comprising:
   a variable frequency oscillator;
   a potentiometer adapted and arranged to vary a frequency of said variable frequency oscillator, said potentiometer being user-accessible; and
   a counter having a clock input coupled to said oscillator, a reset input coupled to said sensing means, and an output coupled to said switch means.

* * * * *